United States Patent Office 3,015,448
Patented Jan. 2, 1962

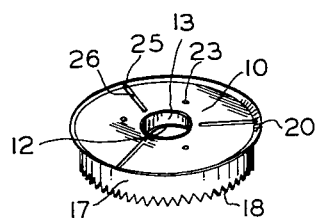
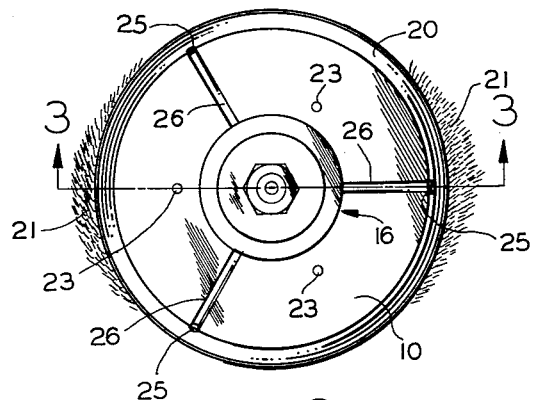
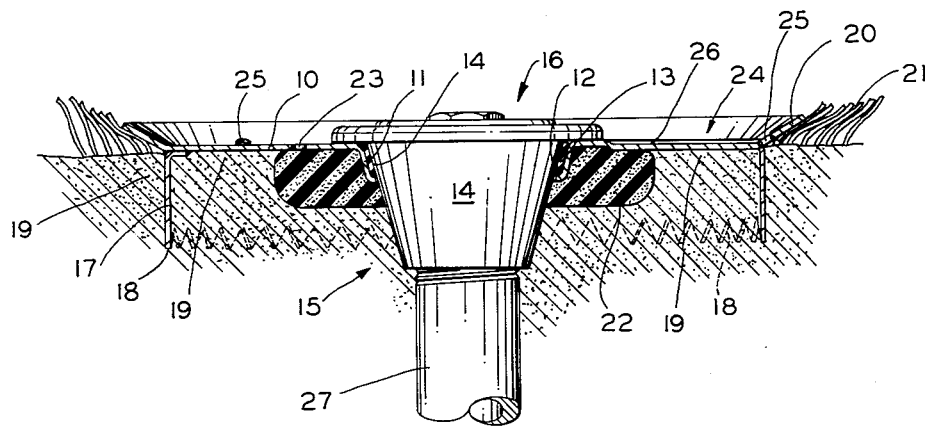
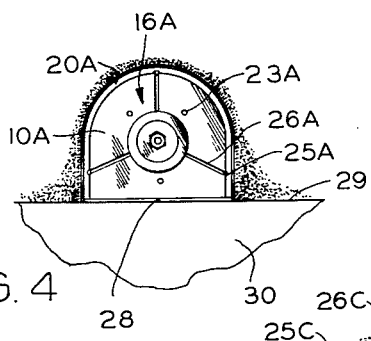
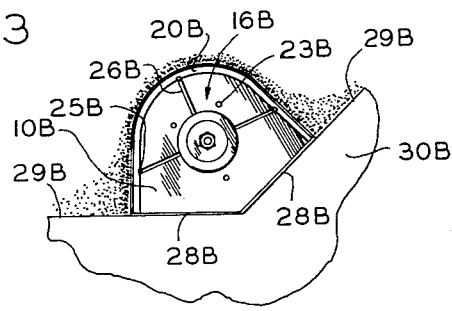
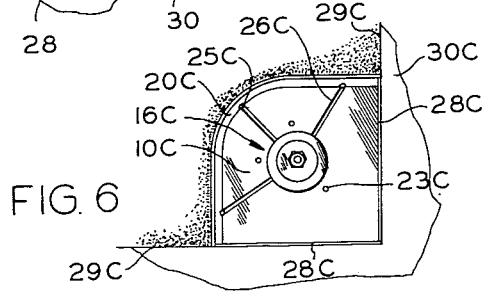
INVENTOR.
BERNARD F. HURLESS

3,015,448
LAWN SPRINKLER HEAD GUARD
Bernard F. Hurless, 15004 Sunstone Park, Sherman Oaks, Calif., assignor of one-tenth to Gadget-Of-The-Month Club, Inc., North Hollywood, Calif., a corporation of California
Filed Dec. 12, 1960, Ser. No. 75,341
5 Claims. (Cl. 239—201)

The present invention consists of a guard for lawn sprinkler heads of the type customarily employed in permanent or embedded lawn sprinkler systems wherein underlying piping is completely embedded in the ground underneath a lawn. In such systems the lawn frequently grows excessively immediately around each of the lawn sprinkler heads to a degree such as to virtually cover the head and to seriously interfere with its proper operation.

The lawn sprinkler head guard of the present invention is adapted to engage and be positioned around a lawn sprinkler head in a manner effectively covering and inhibiting the growth of grass immediately adjacent to the lawn sprinkler head whereby to completely overcome the above-mentioned prior art problem frequently encountered in such permanently installed lawn sprinkler systems.

It is a primary object of the present invention to provide a lawn sprinkler head guard of the character referred to above adapted to completely overcome the usual tendency of the grass to grow more luxuriantly around a lawn sprinkler head due to the concentration of water at that spot and to further prevent the grass from growing over the head and thus seriously interfering with the desired distribution of water over the surrounding area.

It is a further object of the present invention to provide a lawn sprinkler head guard of the character referred to above, which will effectively prevent damage to a lawn sprinkler head by keeping it in full view at all times, thus preventing it from being struck by the wheels or blades of a lawnmower or other heavy object.

It is a further object to provide a lawn sprinkler head guard of the character referred to above, which minimizes the possibility of injury to persons, particularly small children or very elderly persons, when in the yard, because of the fact that the lawn sprinkler head is in full view at all times and is never obscured by grass growing over it so that the chance of a child or elderly person tripping over the sprinkler head and being injured is greatly reduced.

It is a further object of the present invention to provide a lawn sprinkler head guard of the character referred to above, which will effectively provide a more firm anchorage for the lawn sprinkler head and connecting water pipe than is true of prior art arrangements. In one preferred form of the present invention, a serrated ground-penetrating rim around the bottom of the guard is pressed into the ground and provides a very firm foundation for an encompassed sprinkler head and, at the same time, cuts the grass roots around the lawn sprinkler head and prevents their extending under the guard.

It is a further object to provide a lawn sprinkler head guard of the character referred to above adapted to provide a better structural foundation and base for a lawn sprinkler system wherein plastic pipe is used. This is so because the close-fitting lawn sprinkler head guard of the present invention transfers weight directly downwardly from the lawn sprinkler head to a comparatively large area of underlying ground surface. This will prevent a plastic pipe from being broken in the event that a person should step directly upon the lawn sprinkler head (and head guard).

It is a further object to provide a lawn sprinkler head guard including means for effectively feeding controlled amounts of weed and/or grass poison to an area underneath the guard whereby to positively and definitely kill grass and weeds thereunder.

It is a further object to provide a lawn sprinkler head guard of the character referred to above, which includes a weed or growth deflection portion comprising an upwardly, outwardly angularly extending growth deflector adapted to deflect weeds, grass, and other growing objects so that it is virtually impossible for them to grow over the peripheral edge of the guard of the present invention.

It is a further object to provide a lawn sprinkler head guard of the character referred to in the preceding object wherein the upwardly, outwardly, angularly extending growth deflector and a centrally connected cover member portion of the guard effectively define an upper chamber immediately around and underlying the water sprinkler head and provided with peripheral drain aperture means and communicating trough means for draining liquid out of said chamber and through said drain aperture means when desired and yet which can provide, when desired, a drinking chamber for birds or other small pets by merely plugging or closing off the drain aperture means.

It is a further object of the present invention to provide a lawn sprinkler head guard of the character referred to above which is of extremely simple, cheap, foolproof construction such as to be conducive to widespread use of the device.

Further objects are implicit in the detailed description which follows hereinafter and will be apparent to persons skilled in the art after a careful study thereof.

The above-mentioned objects of the present invention provide and imply certain novel features of construction as fully set forth in the specification, as illustrated in the accompanying drawings, and as defined in the appended claims. However, the invention is not specifically limited to the precise structural details illustrated in the accompanying drawings and described specifically in the present specification. Various modifications within the basic teachings and scope of the present invention as defined in the appended claims are intended to be included and comprehended herein.

For the purpose of clarifying the nature of the present invention, several exemplary embodiments of the present invention are illustrated in the hereinbelow-described figures of the accompanying single drawing sheet and are described in detail hereinafter.

FIG. 1 is a reduced-size perspective view of one exemplary embodiment of the present invention shown prior to installation with respect to a lawn sprinkler head and a lawn surface therearound.

FIG. 2 is a larger scale top plan view of the embodiment of the invention illustrated in FIG. 1 after mounting it with respect to a lawn sprinkler head and an underlying grass-covered ground surface (shown in part only).

FIG. 3 is an enlarged view taken in the direction of the arrows 3—3 of FIG. 2 and shows the guard of the present invention in vertical section and also shows the ground surface in vertical section. However, the engaged lawn sprinkler head is shown in elevation.

FIG. 4 is a reduced-size plan view of a slightly modified form of the invention adapted to be positioned immediately adjacent to a straight edge of a sidewalk or other concrete surface, or the like, bordering the lawn area which is to be watered.

FIG. 5 is a reduced-size plan view of another slightly modified form of the invention adapted to be positioned immediately adjacent to an angularly bent edge of a sidewalk or other concrete surface, or the like, bordering the lawn area which is to be watered.

FIG. 6 is a reduced-size plan view of another slightly modified form of the invention adapted to be positioned immediately adjacent to a corner edge of a sidewalk or other concrete surface, or the like, bordering the lawn area which is to be watered.

Referring to FIGS. 1-3 for exemplary purposes, one illustrative embodiment of the invention takes a typical exemplary form wherein it comprises a growth-inhibiting cover member 10 which, in this illustrated form of the invention, is of substantially flat disc-like circular configuration and made of thin-sheet material such as metal, plastic, or other suitable material. The growth-inhibiting cover member 10 is provided with sprinkler-engaging means for engaging a lawn sprinkler head. In the speific example illustrated, the sprinkler-engaging means is centrally positioned in the cover member 10 and comprises a downwardly directed aperture-defining portion 11 which is centrally positioned in the cover member 10 and which is of circular configuration as seen in plan view.

Said aperture-defining portion 11 converges as it extends downwardly and is provided with an inwardly directed lip 12 adapted to retain a compressible or elastomeric sealing ring 13 in the position best shown in FIG. 3 for forcible sealing engagement with the correspondingly tapered lower portion 14 of a lawn sprinkler head, indicated generally at 15, thus providing an arrangement wherein the lawn sprinkler head 15 is sealingly mounted in central relationship with respect to the cover member 10 and with the water emission portion of the lawn sprinkler head at the top thereof, as indicated generally by the reference numeral 16, being positioned above the cover member 10.

In the specific embodiment of the invention illustrated, in FIGS. 1-3, the cover member 10 further includes downwardly directly ground-penetrating means adapted to be forced downwardly into a ground surface around an engaged water sprinkler head for firmly positioning and immobilizing the growth-inhibiting cover member 10 with respect to an underlying ground surface.

In the specific example illustrated, the downwardly directed ground-penetrating means is indicated at 17 and comprises a rim means carried around the periphery of the cover member 10 and extending downwardly to a lower treminal edge which effectively comprises a serrated cutting edge, as indicated at 18, and which is adapted to be forced downwardly into a ground surface indicated at 19 until the lower surface of the cover member 10 lies immediately above the ground surface 19 and any grass or weeds which may be growing thereon.

This provides an arrangement whereby the grass or weeds carried by the ground surface 19 in the area covered by the cover means 10 will die out within a short period of time after installation of the lawn sprinkler head guard of the present invention into the fully installed position shown in FIGS. 2 and 3.

The growth-inhibiting cover member 10 may further be peripherally provided with an angularly upwardly and outwardly extending growth deflector, such as that shown at 20, which comprises an edge flange. The growth deflector 20 prevents surrounding weeds or grass such as that shown at 21 from growing over the edge of the growth deflector 20, thus providing a completely clear and unobstructed area around the lawn sprinkler head 15 co-extensive with the area defined by the cover member 10 and the lower edge of the growth deflector 20.

I have found that the growth deflector 20 is particularly effective when it is so positioned with respect to the upper surface of the cover member 10 as to define therebetween an included angle of substantially 150 degrees. However, this is illustrative of a preferred embodiment of the invention and is not to be construed as specifically limiting all versions of the invention to this specific angular relationship.

In one preferred form of the invention, the cover member 10 may be provided thereunder with poison-holding means for inhibiting growth under the cover member 10. In the form of the invention illustrated in FIG. 3, this takes the form of absorbent means 22 which may comprise a sponge or any other suitable absorbent medium carried underneath the cover member 10 immediately around the tapered lower potrion 14 of the sprinkler head 15 and being adapted to be supplied with liquid growth-inhibiting or weed-killing poison by way of poison entry aperture means 23 extending downwardly through the cover member 10 at spaced locations in vertical communication with the poison-holding absorbent member 22.

It should be noted that the growth-deflector 20, together with the cover member 10, effectively define an upper chamber, indicated generally at 24, which would normally tend to accumulate water as a result of operation of the sprinkler—particularly if small holes 23 are closed in any suitable manner. In order to drain off this excess water, the cover member 10 is provided with peripheral drain aperture means 25 and communicating trough means 26 carried by the upper surface of the cover member 10 for draining liquid out of the chamber 24 through said drain aperture means 25. In the specific example illustrated, the trough means 26 comprise downwardly depressed grooves formed in the upper surface of the cover member, and the drain aperture means comprise spaced holes carried by the growth deflector 20 adjacent the junction thereof with the cover member 10. In certain instances, it may be considered desirable to not drain excess water out of the upper chamber 24 but to allow it to accumulate so as to provide a watering place for birds or other small pets. This may be accomplished simply by closing off or plugging the drain aperture means 25 (and, usually, the small holes 23), when desired.

It should be noted that normally a surplus of water accumulates around a sprinkler head due to the drainage when the water is shut off. Under these conditions, the grass grows much faster there than in the other parts of the lawn. Constant cutting away of this grass and the normal erosion effects tend to wear away the soil, leaving a slight depression around the sprinkler head. This depression, which leaves the sprinkler head projecting slightly upwardly, is a hazard since people may readily stumble over it, particularly children playing in the yard. Furthermore, the sprinkler system itself is much more liable to injury by reason of such a projection of the sprinkler head above a surrounding depression since any heavy object which may strike the sprinkler head such as a lawnmower, or the like, will have much more effect thereon than if it were fully supported by surrounding turf. The novel lawn sprinkler head guard of the present invention prevents all of these prior art disadvantages and problems by inhibiting excessive growth of grass around the lawn sprinkler head and by preventing any soil erosion therearound. Additionally, the guard of the present invention provides a structural support for the lawn sprinkler head itself. The installation of the guard of the present invention is very simple. First the lawn sprinkler head 15 is threadedly removed from the pipe 27. Then the guard of the present invention is centered above the pipe 27 and the serrated cutting edge 18 of the ground-penetrating rim portion 17 is forced downwardly through the grass 21 and into the ground surface 19. Then the lawn sprinkler head 15 is replaced and re-engaged with respect to the pipe 27 and at the same time firmly sealingly engaged with respect to the sealing ring 13. The device is then fully installed and ready for use.

FIG. 4 illustrates a slight modification of the invention wherein the only difference is the plan view shape of the lawn sprinkler head guard; it being so shaped as to have one flat edge 28 adapted to engage a corresponding edge 29 of a piece of paving such as sidewalk, or the like, as indicated at 30. In other words, this type of guard is employed for use with a sprinkler head adapted to water lawn areas adjacent to a straight edge sidewalk, or the like. Since the device is basically similar, corresponding reference numerals are used for corresponding parts, followed by the letter "A," however.

FIG. 5 illustrates another slight modification of the invention wherein the only difference is the plan view shape of the lawn sprinkler head guard; it being so shaped as to have two angularly related edges 28B adapted to engage the corresponding angularly related edges 29B of a piece of paving such as sidewalk, or the like, as indicated at 30B. In other words, this type of guard is employed for use with a sprinkler head adapted to water lawn areas adjacent to an angular bend in a sidewalk, or the like. Since the device is basically similar, corresponding reference numerals are used for corresponding parts, followed by the letter "B," however.

FIG. 6 illustrates another slight modification of the invention wherein the only difference is the plan view shape of the lawn sprinkler head guard; it being so shaped as to have perpendicularly related edges 28C adapted to engage corresponding perpendicularly related edges 29C of a piece of paving such as sidewalk, or the like, as indicated at 30C. In other words, this type of guard is employed for use with a sprinkler head adapted to water lawn areas adjacent to a corner of a sidewalk, or the like. Since the device is basically similar, corresponding reference numerals are used for corresponding parts, followed by the letter "C," however.

It should be noted that in certain forms of the invention the poison-holding means 22 may be modified substantially or eliminated. This is also true of the poison entry aperture means 23 and, in certain forms of the invention, of the trough means 26 and/or drain aperture means 25.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A lawn sprinkler head guard comprising a growth-inhibiting cover member, said cover member being provided with sprinkler-engaging means comprising an aperture-defining portion for engaging a lawn sprinkler head below an upper water emission portion thereof whereby to firmly position the growth-inhibiting cover member around the lawn sprinkler head and immediately over and in growth-inhibiting relationship with respect to adjacent underlying ground surface portions; said growth-inhibiting cover member being peripherally provided with a growth deflector adapted to deflect weeds and other growing objects from growing over the peripheral edge of the growth-inhibiting cover member, said growth deflector and the upper surface of said growth-inhibiting cover member defining an upper chamber provided with peripheral drain aperture means and communicating trough means for draining liquid out of said chamber through said drain aperture means, said trough means comprising downwardly depressed grooves formed in the upper surface of said cover member.

2. A lawn sprinkler head guard comprising a growth-inhibiting cover member, said cover member being provided with sprinkler-engaging means comprising an aperture-defining portion for engaging a lawn sprinkler head below an upper water emission portion thereof whereby to firmly position the growth-inhibiting cover member around the lawn sprinkler head and immediately over and in growth-inhibiting relationship with respect to adjacent underlying ground surface portions; said growth-inhibiting cover member being peripherally provided with an angularly upwardly and outwardly extending growth deflector adapted to deflect weeds and other growing objects from growing over the peripheral edge of the growth-inhibiting cover member, said growth deflector and the upper surface of said growth-inhibiting cover member defining an upper chamber provided with peripheral drain aperture means and communicating trough means carried by the upper surface of said cover member for draining liquid out of said chamber through said drain aperture means.

3. A lawn sprinkler head guard comprising a growth-inhibiting cover member, said cover member being provided with sprinkler-engaging means comprising an aperture-defining portion for engaging a lawn sprinkler head below an upper water emission portion thereof whereby to firmly position the growth-inhibiting cover member around the lawn sprinkler head and immediately over and in growth-inhibiting relationship with respect to adjacent underlying ground surface portions; said growth-inhibiting cover member being peripherally provided with an angularly upwardly and outwardly extending growth deflector adapted to deflect weeds and other growing objects from growing over the peripheral edge of the growth-inhibiting cover member, said growth deflector and the upper surface of said growth-inhibiting cover member defining an upper chamber provided with peripheral drain aperture means and communicating trough means carried by the upper surface of said cover member for draining liquid out of said chamber through said drain aperture means, said trough means comprising downwardly depressed grooves formed in the upper surface of said cover member.

4. A lawn sprinkler head guard comprising a growth-inhibiting cover member, said cover member being provided with sprinkler-engaging means comprising an aperture-defining portion for engaging a lawn sprinkler head below an upper water emission portion thereof whereby to firmly position the growth-inhibiting cover member around the lawn sprinkler head and immediately over and in growth-inhibiting relationship with respect to adjacent underlying ground surface portions; said growth-inhibiting cover member being peripherally provided with an angularly upwardly and outwardly extending growth deflector adapted to deflect weeds and other growing objects from growing over the peripheral edge of the growth-inhibiting cover member, said growth deflector and the upper surface of said growth-inhibiting cover member being so positioned as to include therebetween an angle of substantially 150 degrees, said growth deflector and the upper surface of said growth-inhibiting cover member defining an upper chamber provided with peripheral drain aperture means and communicating trough means carried by the upper surface of said cover member for draining liquid out of said chamber through said drain aperture means, said trough means comprising downwardly depressed grooves formed in the upper surface of said cover member.

5. A lawn sprinkler head guard adapted to engage and be positioned around a lawn sprinkler head of the permanently embedded type for inhibiting the growth of grass immediately adjacent to the sprinkler head, comprising a growth-inhibiting cover member, said cover member being provided with sprinkler-engaging means comprising a downwardly directed aperture-defining portion provided with compressible sealing ring means for sealingly engaging a lawn sprinkler head around a downwardly convergingly tapered lower portion of the lawn sprinkler head below an upper water emission portion thereof whereby to firmly position the growth-inhibiting cover member around the lawn sprinkler head and immediately over and in growth-inhibiting relationship with respect to adjacent underlying ground surface portions, said growth-inhibiting cover member being provided with downwardly directed ground-penetrating rim means having a serrated cutting edge around the periphery thereof and adapted to be forced downwardly into a ground surface immediately around an engaged water sprinkler head for firmly positioning and immobilizing the growth-inhibiting cover member with respect to underlying ground surface portions, said growth-inhibiting cover member being peripherally provided with an angularly upwardly and outwardly extending growth deflector adapted to deflect weeds and other growing objects from growing over the peripheral edge of the growth-inhibiting cover member, said cover member, said growth deflector, and said ground-penetrating means being of rigid construction formed of thin-sheet material.

References Cited in the file of this patent

UNITED STATES PATENTS

| | | |
|---|---|---|
| 2,080,341 | Schumacher | May 11, 1937 |
| 2,591,282 | Nelson | Apr. 1, 1952 |
| 2,721,099 | Rupp | Oct. 18, 1955 |
| 2,751,250 | Block | June 19, 1956 |
| 2,782,561 | Smith | Feb. 26, 1957 |
| 2,845,302 | Hanf | July 29, 1958 |